US009288771B2

(12) United States Patent
Kim et al.

(10) Patent No.: US 9,288,771 B2
(45) Date of Patent: *Mar. 15, 2016

(54) TERMINAL DEVICE FOR TRANSMITTING A POWER HEADROOM REPORT IN A MULTI-CARRIER COMMUNICATION SYSTEM, AND METHOD FOR SAME

(71) Applicant: LG ELECTRONICS INC., Seoul (KR)

(72) Inventors: Dong Cheol Kim, Anyang-si (KR); Sung Ho Moon, Anyang-si (KR); Han Gyu Cho, Anyang-si (KR); Jae Hoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,120

(22) Filed: Jul. 31, 2015

(65) Prior Publication Data

US 2015/0341870 A1  Nov. 26, 2015

Related U.S. Application Data

(63) Continuation of application No. 14/632,353, filed on Feb. 26, 2015, now Pat. No. 9,148,860, which is a continuation of application No. 13/508,349, filed as application No. PCT/KR2010/007765 on Nov. 4, 2010, now Pat. No. 9,025,541.

(60) Provisional application No. 61/320,304, filed on Apr. 1, 2010, provisional application No. 61/258,163, filed on Nov. 4, 2009.

(51) Int. Cl.
*H04W 72/04* (2009.01)
*H04W 52/36* (2009.01)
(Continued)

(52) U.S. Cl.
CPC ......... *H04W 52/365* (2013.01); *H04J 11/0036* (2013.01); *H04L 5/0007* (2013.01);
(Continued)

(58) Field of Classification Search
CPC ... H04L 1/0027; H04L 5/0037; H04L 5/0053; H04L 5/0057; H04L 5/0091; H04W 72/042; H04W 72/121; H04W 48/08; H04W 48/121; H04W 88/08; H04W 88/121
USPC .................................................. 370/328, 329
See application file for complete search history.

(56) References Cited

U.S. PATENT DOCUMENTS

| | | | | |
|---|---|---|---|---|
| 8,626,225 | B2 * | 1/2014 | Heo ..................... | H04W 52/365 370/310 |
| 2010/0273520 | A1 * | 10/2010 | Pelletier ................ | H04L 5/0007 455/522 |
| 2010/0297993 | A1 * | 11/2010 | Heo ..................... | H04W 52/365 455/423 |

(Continued)

FOREIGN PATENT DOCUMENTS

EP          2584715         4/2013

OTHER PUBLICATIONS

Research in Motion, UK Limited, "Uplink Power Control for Carrier Aggregation," 3GPP TSG RAN WG1 Meeting #58bis, R1-094118, Oct. 2009, 4 pages.
(Continued)

*Primary Examiner* — Andrew Chriss
*Assistant Examiner* — Rasha Fayed
(74) *Attorney, Agent, or Firm* — Lee, Hong, Degerman, Kang & Waimey

(57) ABSTRACT

A method and device for transmitting a power headroom report (PHR) by a user equipment (UE) in a communication system supporting a plurality of carriers. The method includes transmitting, to an eNode B (eNB), a power headroom report (PHR) related to the plurality of carriers configured for the UE. The power headroom report (PHR) comprises a first type power headroom (PH) and a second type power headroom (PH). While the first type power headroom (PH) is calculated for a power headroom report (PHR) related to a primary carrier and a non-primary carrier, the second type power headroom (PH) is calculated for a power headroom report (PHR) related to only the primary carrier. The second type power headroom (PH) is calculated for case of simultaneous transmission of a physical uplink control channel (PUCCH) and a physical uplink shared channel (PUSCH).

12 Claims, 7 Drawing Sheets

(51) Int. Cl.
*H04L 5/00* (2006.01)
*H04J 11/00* (2006.01)
*H04W 88/02* (2009.01)

(52) U.S. Cl.
CPC ........ *H04W52/367* (2013.01); *H04W 72/0413* (2013.01); *H04W 72/0453* (2013.01); *H04W 88/02* (2013.01)

(56) References Cited

U.S. PATENT DOCUMENTS

| | | | | |
|---|---|---|---|---|
| 2011/0105173 | A1* | 5/2011 | Haim | H04W 52/244 455/522 |
| 2011/0116464 | A1* | 5/2011 | Ishii | H04L 1/0027 370/329 |
| 2011/0158117 | A1* | 6/2011 | Ho | H04W 52/34 370/252 |

OTHER PUBLICATIONS

Huawei, "UL Power Control in Carrier Aggregation," 3GPP TSG RAN WG1 Meeting #58bis, R1-093840, Oct. 2009, 4 pages.

European Patent Office Application Serial No. 10828536.2, Search Report dated Feb. 26, 2015, 10 pages.

Nokia Siemens Networks et al., "Power Headroom Reporting for EUTRAN uplink", R1-080329, 3GPP TSG RAN WG1 #51bis Meeting, Jan. 2008, 3 pages.

Ericsson et al., "Uplink Power Control for Carrier Aggregation", R1-094274, 3GPP TSG RAN WG1 Meeting #58bis, Oct. 2009, 4 pages.

Texas Instruments, "Consideration of Supportable TF for E-UTRA DL", R1-074682, 3GPP TSG RAN WG1 51, Nov. 2007, 6 pages.

Ericsson et al., "Way Forward for Power Headroom Reporting", R1-081701, 3GPP TSG-RAN WG1 #52bis, Mar. 2008, 1 page.

* cited by examiner (a)

(b)

TERMINAL DEVICE FOR TRANSMITTING A POWER HEADROOM REPORT IN A MULTI-CARRIER COMMUNICATION SYSTEM, AND METHOD FOR SAME

CROSS-REFERENCE TO RELATED APPLICATIONS

This application is a continuation of U.S. patent application Ser. No. 14/632,353, filed on Feb. 26, 2015, now U.S. Pat. No. 9,148,860, which is a continuation of U.S. patent application Ser. No. 13/508,349, filed on May 4, 2012, now U.S. Pat. No. 9,025,541, which is the National Stage filing under 35 U.S.C. 371 of International Application No. PCT/KR2010/007765, filed on Nov. 4, 2010, which claims the benefit of U.S. Provisional Application Nos. 61/320,304, filed on Apr. 1, 2010, and 61/258,163, filed on Nov. 4, 2009, the contents of which are all hereby incorporated by reference herein in their entirety.

FIELD OF THE INVENTION

The present invention relates to a method and apparatus for transmitting a power headroom report (PHR).

BACKGROUND ART

As a representative example of a wireless communication system of the present invention, $3^{rd}$ Generation Partnership Project Long Term Evolution (3GPP LTE) and LTE-Advanced (LTE-A) communication systems will hereinafter be described in detail.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

Recently, 3GPP has been establishing a standard task for a subsequent technique of LTE. In this specification, such a technique is referred to as "LTE-Advanced" or "LTE-A". One of the main differences between an LTE system and an LTE-A system is a system bandwidth.

The LTE-A system is aimed at supporting a broadband of a maximum of 100 MHz, and to this end, the LTE-A system is designed to use a carrier aggregation or bandwidth aggregation technique using a plurality of frequency blocks. Carrier aggregation employs a plurality of frequency blocks as one big logical frequency band in order to use a wider frequency band. A bandwidth of each frequency block may be defined based on a bandwidth of a system block used in the LTE system. Each frequency block is transmitted using a component carrier.

Carrier aggregation technology is applied to the LTE-A system acting as the next generation communication system, such that there is needed a method for allowing a UE to perform a power headroom report (PHR) using multiple carriers. However, the above-mentioned method for performing the power headroom report (PHR) by the UE has not yet been disclosed.

DETAILED DESCRIPTION OF THE INVENTION

Technical Problem

Accordingly, the present invention is directed to a UE for transmitting a power headroom report (PHR) in a multi-carrier support communication system and an apparatus for the same that substantially obviate one or more problems due to limitations and disadvantages of the related art. An object of the present invention is to provide a method for transmitting a power headroom report (PHR) by a user equipment (UE) in a multi-carrier support communication system.

Another object of the present invention is to provide a UE apparatus for enabling a UE to transmit a power headroom report (PHR) in a multi-carrier support communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting a power headroom report (PHR) by a user equipment (UE) in a communication system supporting multiple carriers including: transmitting a power headroom report (PHR) of one or more activated component carriers allocated to the UE from among the multiple carriers to an eNode B (eNB), wherein the power headroom report (PHR) includes not only first type power headroom (PH) information calculated using a power value of a physical uplink shared channel (PUSCH) of a primary component carrier (PCC) from among the activated component carriers and second-type power headroom (PH) information calculated using a PUSCH power value of the primary component carrier (PCC) and a Physical Uplink Control Channel (PUCCH) power value.

The UE may transmit the power headroom report (PHR) of the primary component carrier (PCC) and one or more first-type power headroom (PH) information calculated using a PUSCH power value for each carrier in association with the remaining one or more component carriers other than the primary component carrier (PCC) from among the activated component carriers to the eNode B (eNB).

The UE may transmit a virtual power headroom report (PHR) for an unscheduled carrier from among the one or more activated component carriers.

The first type power headroom (PH) information may be calculated by subtracting the PUSCH power value of the primary component carrier (PCC) from a maximum transmittable power value of the UE. The second type power headroom (PH) information may be calculated by subtracting the PUSCH power value of the primary component carrier (PCC) and the PUCCH power value from a maximum transmittable power value of the UE. The power headroom report (PHR) may be transmitted in units of a subframe.

The one or more first type power headroom (PH) information calculated for each carrier of the remaining one or more component carriers may be calculated by subtracting a PUSCH power value of the remaining one or more component carriers from the maximum transmittable power value of the UE.

Meanwhile, the first- and second type information may be transmitted through one PUSCH resource or different PUSCHs.

The first type power headroom (PH) information of the primary component carrier (PCC) may be calculated by the following equation A, and the second-type power headroom (PH) information may be calculated by the following equation B:

$$PH_{PUSCH}(k) = P_{MAX}(k) - P_{PUSCH}(k) \qquad [\text{Equation A}]$$

$$PH(k) = P_{MAX}(k) - (P_{PUSCH}(k) + P_{PUCCH}(k)) \qquad [\text{Equation B}]$$

where k is a carrier index of the primary component carrier (PCC), and $P_{MAX}(k)$ is a maximum transmittable power value of the UE at the primary component carrier (PCC) having an index (k).

The one or more first type power headroom (PH) information of the remaining one or more component carriers may be calculated by the following equation A:

$$PH_{PUSCH}(k) = P_{MAX}(k) - P_{PUSCH}(k) \qquad [\text{Equation A}]$$

where k is an index of the remaining one or more component carriers, and $P_{MAX}(k)$ is a maximum transmittable power value of the UE at the remaining one or more component carriers each having an index (k).

In another aspect of the present invention, a user equipment (UE) apparatus for transmitting a power headroom report (PHR) in a communication system supporting multiple carriers includes a transmitter for transmitting a power headroom report (PHR) of one or more activated component carriers allocated to the UE from among the multiple carriers to an eNode B (eNB); and a processor for controlling the transmitter to transmit the PHR including first type power headroom (PH) information calculated using a power value of a physical uplink shared channel (PUSCH) of a primary component carrier (PCC) from among the activated component carriers and second type power headroom (PH) information calculated using a PUSCH power value of the primary component carrier (PCC) and a Physical Uplink Control Channel (PUCCH) power value in the power headroom report (PHR).

The processor may control the transmitter to transmit the power headroom report (PHR) of the primary component carrier (PCC) and one or more first type power headroom (PH) information calculated using a PUSCH power value for each carrier in association with the remaining one or more component carriers other than the primary component carrier (PCC) from among the activated component carriers to the eNode B (eNB).

The processor may control the transmitter to transmit a virtual power headroom report (PHR) for an unscheduled carrier from among the one or more activated component carriers.

Effects of the Invention

As is apparent from the above description, exemplary embodiments of the present invention have the following effects. A UE apparatus can effectively transmit an uplink power headroom report (PHR) even in a multi-carrier communication system.

If there are many multi-carrier systems or many uplink data and control channels to be simultaneously transmitted, a UE can minimize the number of generable transmission power limitation situations, such that it can effectively transmit a power headroom report (PHR).

The eNode B (eNB) can efficiently establish a UE MCS level or the like using a power headroom reported by a UE, and can more precisely control the UE, resulting in implementation of efficient scheduling.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include an eNode B (eNB), a Node B (Node-B), an access point (AP) and the like.

In a mobile communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
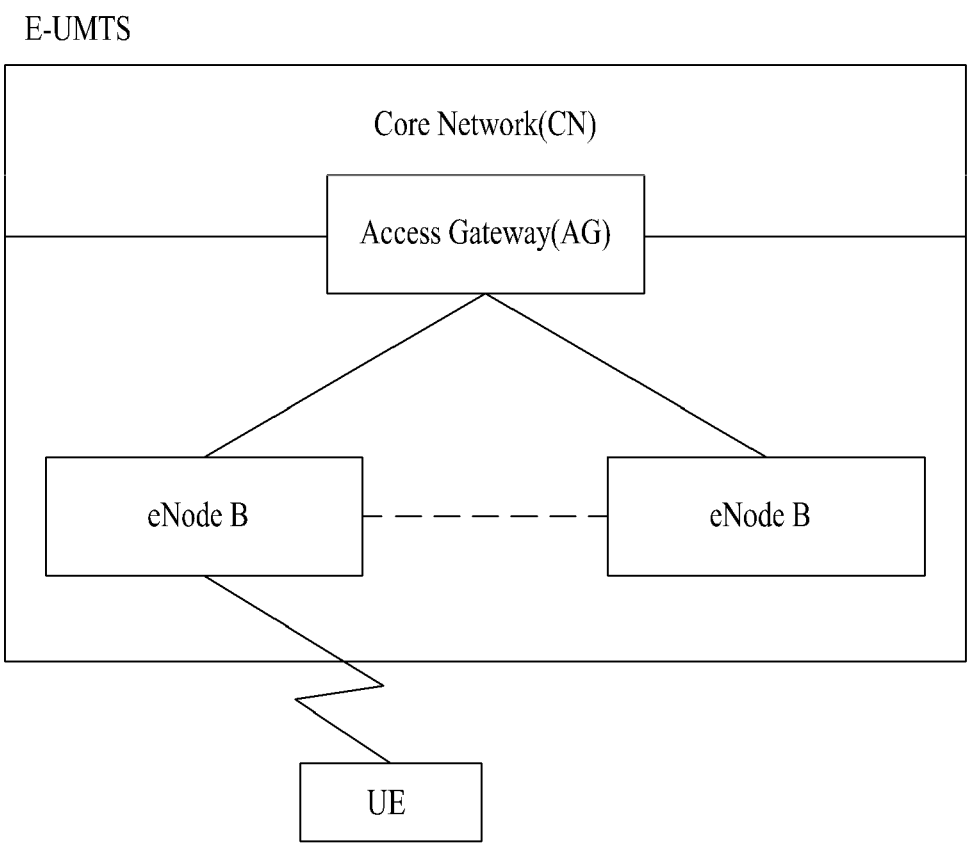
FIG. 1 is a conceptual diagram illustrating an Evolved Universal Mobile Telecommunications System (E-UMTS) network structure as an example of a wireless communication system.
Figure 2:
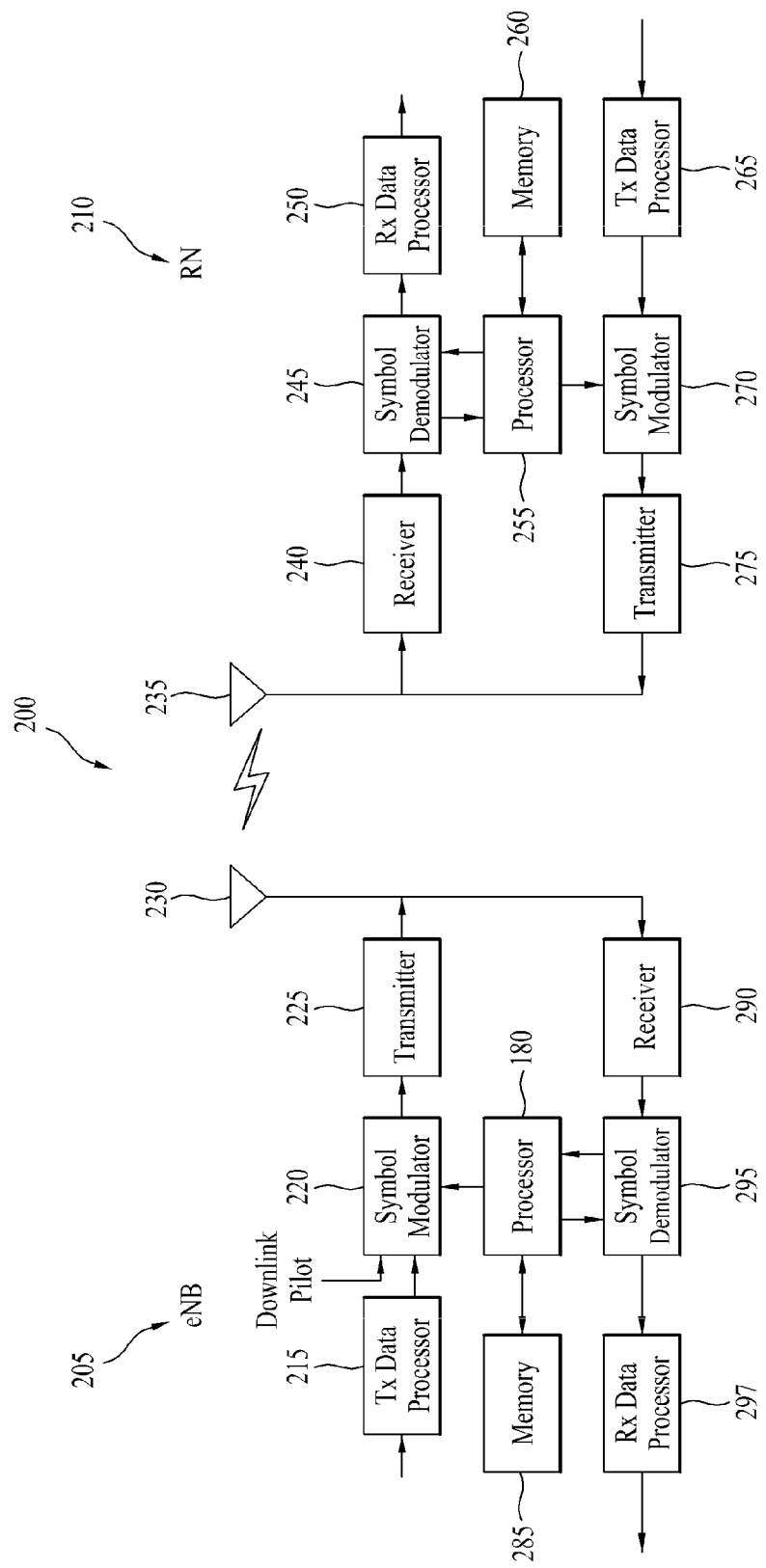
FIG. 2 is a block diagram illustrating an eNode B (eNB) and a UE for use in a wireless communication system.

FIG. 2 is a block diagram illustrating an eNode B (eNB) 205 and a user equipment (UE) 210 for use in a wireless communication system 200 according to the present invention.

Although FIG. 2 shows one eNB 205 and one UE 210 for brief description of the wireless communication system 200, it should be noted that the wireless communication system 200 may further include one or more eNBs and/or one or more UEs.

Referring to FIG. 2, the eNB 205 may include a transmission (Tx) data processor 215, a symbol modulator 220, a transmitter 225, a transmission/reception antenna 230, a processor 280, a memory 285, a receiver 290, a symbol demodulator 295, and a reception (Rx) data processor 297. The UE 210 may include a Tx data processor 265, a symbol modulator 270, a transmitter 275, a transmission/reception antenna 235, a processor 255, a memory 260, a receiver 240, a symbol demodulator 255, and a Rx data processor 250. In FIG. 2, although one antenna 230 is used for the eNB 205 and one antenna 235 is used for the UE 210, each of the eNB 205 and the UE 210 may also include a plurality of antennas as necessary. Therefore, the eNB 205 and the UE 210 according to the present invention support a Multiple Input Multiple Output (MIMO) system. The eNB 205 according to the present invention can support both a Single User-MIMO (SU-MIMO) scheme and a Multi User-MIMO (MU-MIMO) scheme.

In downlink, the Tx data processor 215 receives traffic data, formats the received traffic data, codes the formatted traffic data, and interleaves the coded traffic data, and modulates the interleaved data (or performs symbol mapping upon the interleaved data), such that it provides modulation symbols (i.e., data symbols). The symbol modulator 220 receives and processes the data symbols and pilot symbols, such that it provides a stream of symbols.

The symbol modulator 220 multiplexes data and pilot symbols, and transmits the multiplexed data and pilot symbols to the transmitter 225. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 225 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the RN through the antenna 230.

Configuration of the UE 210 will hereinafter be described in detail. The antenna 235 of the UE 210 receives a DL signal from the eNB 205, and transmits the DL signal to the receiver 240. The receiver 240 performs adjustment (e.g., filtering, amplification, and frequency downconversion) of the received DL signal, and digitizes the adjusted signal to obtain samples. The symbol demodulator 245 demodulates the received pilot symbols, and provides the demodulated result to the processor 255 to perform channel estimation.

The symbol demodulator 245 receives a frequency response estimation value for downlink from the processor 255, demodulates the received data symbols, obtains data symbol estimation values (indicating estimation values of the transmitted data symbols), and provides the data symbol estimation values to the Rx data processor 250. The Rx data processor 250 performs demodulation (i.e., symbol-demapping) of data symbol estimation values, deinterleaves the demodulated result, decodes the deinterleaved result, and recovers the transmitted traffic data.

The processing of the symbol demodulator 245 and the Rx data processor 250 is complementary to that of the symbol modulator 220 and the Tx data processor 215 in the eNB 205.

The Tx data processor 265 of the UE 210 processes traffic data in uplink, and provides data symbols. The symbol modulator 270 receives and multiplexes data symbols, and modulates the multiplexed data symbols, such that it can provide a stream of symbols to the transmitter 275. The transmitter 275 receives and processes the stream of symbols to generate an uplink (UL) signal, and the UL signal is transmitted to the eNB 205 through the antenna 235.

The eNB 205 receives the UL signal from the UE 210 through the antenna 230. The receiver processes the received UL signal to obtain samples. Subsequently, the symbol demodulator 295 processes the symbols, and provides pilot symbols and data symbol estimation values received via uplink. The Rx data processor 297 processes the data symbol estimation value, and recovers traffic data received from the UE 210.

Processor 255 or 280 of the UE 210 or the eNB 205 commands or indicates operations of the UE 210 or the eNB 205. For example, the processor 255 or 280 of the UE 210 or the eNB 205 controls, adjusts, and manages operations of the UE 210 or the eNB 205. Each processor 255 or 280 may be connected to a memory unit 260 or 285 for storing program code and data. The memory 260 or 285 is connected to the processor 255 or 280, such that it can store the operating system, applications, and general files.

The processor 255 or 280 may also be referred to as a controller, a microcontroller), a microprocessor, a microcomputer, etc. In the meantime, the processor 255 or 280 may be implemented by various means, for example, hardware, firmware, software, or a combination thereof. In a hardware configuration, methods according to the embodiments of the present invention may be implemented by the processor 255 or 280, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the embodiments of the present invention may be implemented in the form of modules, procedures, functions, etc. which perform the above-described functions or operations. Firmware or software implemented in the present invention may be contained in the processor 255 or 280 or the memory unit 260 or 285, such that it can be driven by the processor 255 or 280.

Radio interface protocol layers among the UE 210, the eNB 205, and a wireless communication system (i.e., network) can be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 210 and the eNB 205 may exchange RRC messages with each other through the wireless communication network and the RRC layer.

Figure 3:
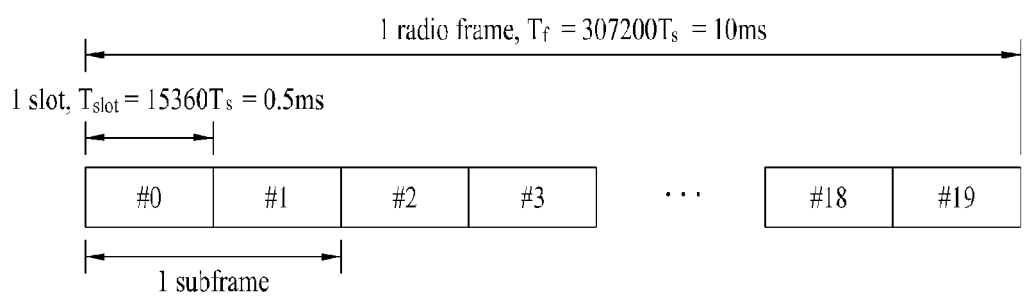
FIG. 3 is a diagram illustrating a structure of a radio frame used in a 3GPP LTE system acting as an exemplary mobile communication system.

FIG. 3 is a diagram illustrating a structure of a radio frame used in a 3GPP LTE system acting as a mobile communication system.

Referring to FIG. 3, the radio frame has a length of 10 ms ($327200*T_s$) and includes 10 subframes of equal size. Each subframe has a length of 1 ms and includes two slots. Each slot has a length of 0.5 ms ($15360*T_s$). In this case, $T_s$ represents a sampling time, and is expressed by '$T_s=1/(15 kHz*2048)=3.2552*10^{-8}$ (about 33 ns)'. The slot includes a plurality of OFDM or SC-FDMA symbols in a time domain, and includes a plurality of resource blocks (RBs) in a frequency domain.

In the LTE system, one resource block includes twelve (12) subcarriers*seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes contained in the radio frame or the number of slots contained in each subframe, or the number of OFDM or SC-FDMA symbols in each slot.

Figure 4:
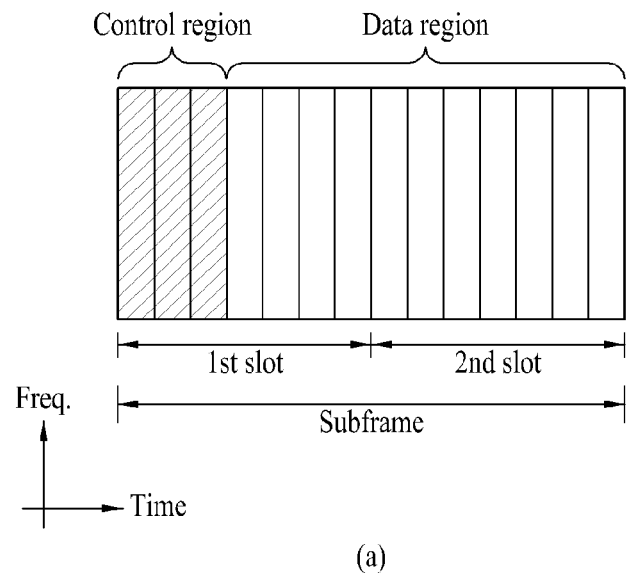
FIG. 4 is an exemplary structural diagram illustrating downlink and uplink subframes for use in a 3GPP LTE system acting as an exemplary mobile communication system according to the present invention.
Figure 4:
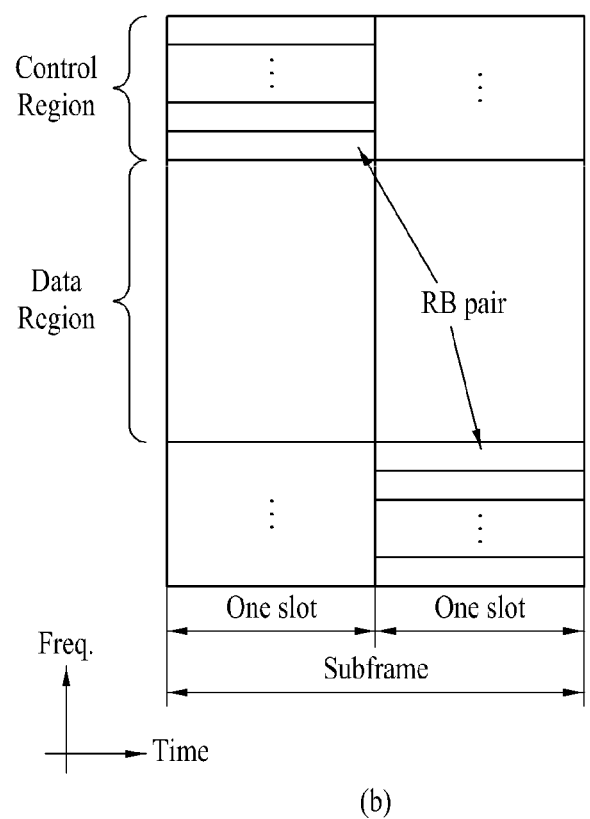

FIG. 4 is an exemplary structural diagram illustrating downlink and uplink subframes for use in a 3GPP LTE system acting as an exemplary mobile communication system according to the present invention.

Referring to FIG. 4(a), one downlink subframe includes two slots in a time domain. A maximum of three OFDM symbols located in the front of the downlink subframe are used as a control region to which control channels are allocated, and the remaining OFDM symbols are used as a data region to which a Physical Downlink Shared Channel (PDSCH) channel is allocated.

DL control channel for use in the 3GPP LTE system includes a Physical Control Format Indicator CHannel (PCFICH), a Physical Downlink Control Channel (PDCCH), a Physical Hybrid-ARQ Indicator CHannel (PHICH), and the like. The traffic channel includes a Physical Downlink Shared CHannel (PDSCH). PCFICH transmitted through a first OFDM symbol of the subframe may carry information about the number of OFDM symbols (i.e., the size of control region) used for transmission of control channels within the subframe. Control information transmitted through PDCCH is referred to as downlink control information (DCI). The DCI may indicate UL resource allocation information, DL resource allocation information, UL transmission power control commands of arbitrary UE groups, etc. PHICH may carry ACK (Acknowledgement)/NACK (Not-Acknowledgement) signals about an UL Hybrid Automatic Repeat Request (UL HARQ). That is, the ACK/NACK signals about UL data transmitted from the UE are transmitted over PHICH.

PDCCH acting as a DL physical channel will hereinafter be described in detail.

A base station (BS) may transmit information about resource allocation and transmission format (UL grant) of the PDSCH, resource allocation information of the PUSCH, information about Voice over Internet Protocol (VoIP) activation, etc. A plurality of PDCCHs may be transmitted within the control region, and the UE may monitor the PDCCHs. Each PFCCH includes an aggregate of one or more contiguous control channel elements (CCEs). The PDCCH composed of the aggregate of one or more contiguous CCEs may be transmitted through the control region after performing subblock interleaving. CCE is a logical allocation unit for providing a coding rate based on a Radio frequency (RF) channel status to the PDCCH. CCE may correspond to a plurality of resource element groups. PDCCH format and the number of available PDCCHs may be determined according to the relationship between the number of CCEs and the coding rate provided by CCEs.

Control information transmitted over PDCCH is referred to as downlink control information (DCI). The following Table 1 shows DCIs in response to DCI formats.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |

TABLE 1-continued

| DCI Format | Description |
|---|---|
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

In Table 1, DCI format 0 may indicate uplink resource allocation information. DCI format 1 and DCI format 2 may indicate downlink resource allocation information. DCI format 3 and DCI format 3A may indicate uplink transmit power control (TPC) commands for arbitrary UE groups.

DCI format 3/3A includes TPC commands of a plurality of UEs. In case of DCI format 3/3A, the eNB is masked onto CRC. TPC-ID is an ID that is demasked by a UE that monitors a PDCCH carrying a TPC command. TPC-ID may be an ID used by a UE that decodes a PDCCH to decide transmission or non-transmission of the TPC command over the PDCCH. TPC-ID may be defined by reusing conventional IDs (i.e., C-RNTI(Radio Network Temporary Identifier), PI-RNTI, SC-RNTI, or RA-RNTI), or may be defined as a new ID. TPC-ID is an ID for UEs of a specific aggregate contained in a cell, such that it is different from C-RNTI acting as an ID of a specific UE. In addition, the TPC_ID is also different from IDs (e.g., PI-RNTI, SC-RNTI and RA-RNTI) of all UEs contained in the cell. If DCI includes a TPC command for N UEs, only N UEs need to receive the TPC commands. If TPC commands for all UEs contained in the cell are contained in a DCI, the TPC-ID is used as an ID for all UEs contained in the cell.

The UE monitors an aggregate of PDCCH candidates in a search space contained in a subframe, such that it searches for TPC-ID. In this case, TPC-ID may be found either in a common search space or in a UE-specific search space. The common search space is a search space in which all UEs contained in the cell can perform the searching operation. The UE-specific search space is a search space in which a specific UE can perform the searching operation. If the CRC error is not detected by demasking a TPC-ID in the corresponding PDCCH candidate, a UE can receive a TPC command on a PDCCH.

An identifier (ID, i.e., TPC-ID) for a PDCCH carrying a plurality of TPC commands is defined. If TPC-ID is detected, the UE receives a TPC command on the corresponding PDCCH. The TPC command is used to adjust transmission (Tx) power of an uplink channel. Therefore, the TPC command can prevent data or information from being transmitted to an eNB due to wrong power control, or can also prevent interference for other UEs.

A method for allowing an eNB to perform resource mapping for PDCCH transmission in the 3GPP LTE system will hereinafter be described in detail.

Generally, the eNB may transmit scheduling allocation information and other control information over the PDCCH. Information about a physical control channel (PCCH) is configured in the form of one aggregate (one aggregation) or several CCEs, such that the resultant information is transmitted as one aggregate or several CCEs. Namely, a PDCCH transmission unit of the eNB is a CCE. One CCE includes 9 resource element groups (REGs). The number of RBGs unallocated to either Physical Control Format Indicator Channel (PCFICH) or Physical Hybrid Automatic Repeat Request Indicator Channel (PHICH) is $N_{REG}$. CCEs from 0 to $N_{CCE}-1$ may be available to a system (where, $N_{CCE}=\lfloor N_{REG}/9 \rfloor$). PDCCH supports multiple formats as shown in the following Table 2. One PDCCH composed of n contiguous CCEs begins with a CCE having 'i mod n=0' (where 'i' is a CCE number). Multiple PDCCHs may be transmitted through one subframe.

TABLE 2

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, an eNode B (eNB) may decide a PDCCH format according to how many regions are required for the BS to transmit control information. The UE reads control information and the like in units of a CCE, resulting in reduction of overhead.

Referring to FIG. 4(b), an uplink (UL) subframe may be divided into a control region and a data region in a frequency domain. The control region may be assigned to a Physical Uplink Control Channel (PUCCH) carrying uplink control information (UCI). The data region may be assigned to a Physical Uplink Shared Channel (PUSCH) carrying user data. In order to maintain single carrier characteristics, one UE does not simultaneously transmit PUCCH and PUSCH. PUCCH for one UE may be assigned to a Resource Block (RB) pair in one subframe. RBs of the RB pair occupy different subcarriers in two slots. The RB pair assigned to PUCCH performs frequency hopping at a slot boundary.

Figure 5:
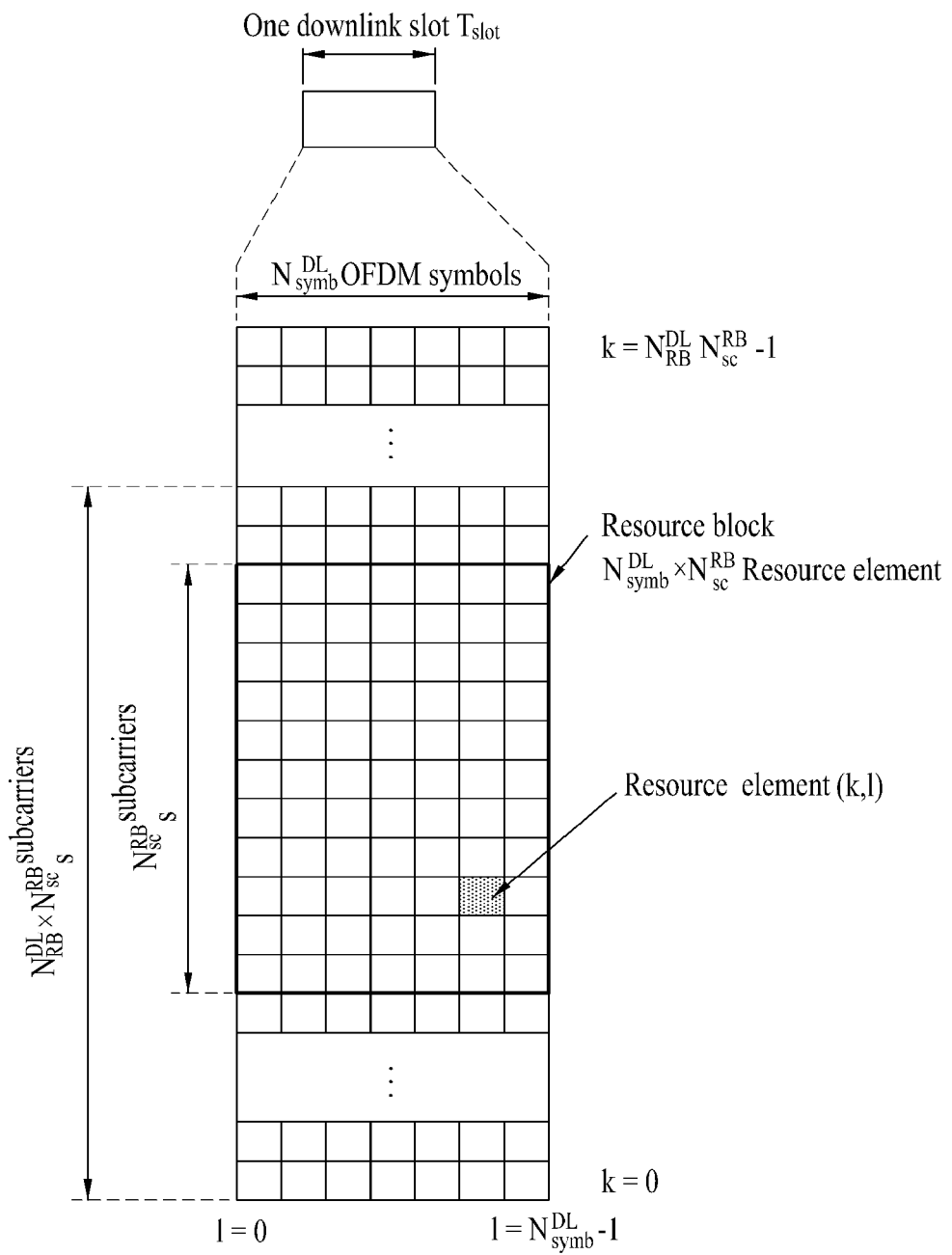
FIG. 5 shows a downlink (DL) time-frequency resource grid structure for use in a 3GPP LTE system.

FIG. 5 shows a downlink time-frequency resource grid structure according to the present invention.

Referring to FIG. 5, downlink transmission resources can be described by a resource grid including $N_{RB}^{DL} \times N_{SC}^{RB}$ subcarriers and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. $N_{RB}^{DL}$ varies with a downlink transmission bandwidth constructed in a cell, and must satisfy $N_{RB}^{min,DL} \leq N_{RB}^{DL} \leq N_{RB}^{max,DL}$. Here, $N_{RB}^{min,DL}$ is the smallest downlink bandwidth supported by the wireless communication system, and $N_{RB}^{max,DL}$ is the largest downlink bandwidth supported by the wireless communication system. Although $N_{RB}^{min,DL}$ may be set to 6 ($N_{RB}^{min,DL}=6$) and $N_{RB}^{max,DL}$ may be set to 110 ($N_{RB}^{max,DL}=110$), the scopes of $N_{RB}^{min,UL}$ and $N_{RB}^{max,UL}$ are not limited thereto. The number of OFDM symbols contained in one slot may be differently defined according to the length of a Cyclic Prefix (CP) and spacing between subcarriers. When transmitting data or information via multiple antennas, one resource grid may be defined for each antenna port.

Each element contained in the resource grid for each antenna port is called a resource element (RE), and can be identified by an index pair (k,l) contained in a slot, where k is an index in a frequency domain and is set to any one of $0, \ldots, N_{RB}^{DL} N_{sc}^{RB}-1$, and l is an index in a time domain and is set to any one of $0, \ldots, N_{symb}^{DL}-1$.

Resource blocks (RBs) shown in FIG. 5 are used to describe a mapping relationship between certain physical channels and resource elements (REs). The RBs can be classified into physical resource blocks (PRBs) and virtual resource blocks (VRBs). One PRB is defined by $N_{symb}^{DL}$ consecutive OFDM symbols in a time domain and $N_{SC}^{RB}$ consecutive subcarriers in a frequency domain. $N_{symb}^{DL}$ and $N_{SC}^{RB}$ may be predetermined values, respectively. For example, $N_{symb}^{DL}$ and $N_{SC}^{RB}$ may be given as shown in the following Table 3. Therefore, one PRB may be composed of $N_{symb}^{DL} \times N_{SC}^{RB}$ resource elements. One PRB may correspond to one slot in a time domain and may also correspond to 180 kHz in a frequency domain, but it should be noted that the scope of the present invention is not limited thereto.

TABLE 3

| Configuration | | $N^{RB}_{SC}$ | $ND^{DL}_{symb}$ |
|---|---|---|---|
| Normal Cyclic Prefix | $\Delta f$ = 15 kHz | 12 | 7 |
| | | | 6 |
| Extended Cyclic Prefix | $\Delta f$ = 15 kHz $\Delta f$ = 7.5 kHz | 24 | 3 |

The PRBs are assigned numbers from 0 to $N_{RB}^{DL}-1$ in the frequency domain. A PRB number $n_{PRB}$ and a resource element index (k,l) in a slot can satisfy a predetermined relationship denoted by $$n_{PRB} = \left\lfloor \frac{k}{N_{sc}^{RB}} \right\rfloor.$$

The VRB may have the same size as that of the PRB. The VRB may be classified into a localized VRB (LVRB) and a distributed VRB (DVRB). For each VRB type, a pair of PRBs allocated over two slots of one subframe is assigned a single VRB number $n_{VRB}$.

The VRB may have the same size as that of the PRB. Two types of VRBs are defined, the first one being a localized VRB (LVRB) and the second one being a distributed type (DVRB). For each VRB type, a pair of PRBs may have a single VRB index (which may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ VRBs belonging to a second one of the two slots are likewise each assigned any one index of 0 to $N_{RB}^{DL}-1$.

A method for allowing the eNB to transmit a PDCCH to a UE in the LTE system will hereinafter be described in detail.

The eNB determines a PDCCH format according to a DCI to be sent to the UE, and attaches a Cyclic Redundancy Check (CRC) to control information. A unique identifier (e.g., a Radio Network Temporary Identifier (RNTI)) is masked onto the CRC according to PDCCH owners or utilities. In case of a PDCCH for a specific UE, a unique ID of a UE, for example, C-RNTI (Cell-RNTI) may be masked onto CRC. Alternatively, in case of a PDCCH for a paging message, a paging indication ID (for example, R-RNTI (Paging-RNTI)) may be masked onto CRC. In case of a PDCCH for system information (SI), a system information ID (i.e., SI-RNTI) may be masked onto CRC. In order to indicate a random access response acting as a response to a UE's random access preamble transmission, RA-RNTI (Random Access-RNTI) may be masked onto CRC. The following Table 4 shows examples of IDs masked onto PDCCH.

TABLE 4

| Type | Identifier | Description |
|---|---|---|
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If C-RNTI is used, PDCCH may carry control information for a specific UE. If another RNTI is used, PDCCH may carry common control information that is received by all or some UEs contained in the cell. The eNB performs channel coding of the CRC-added DCI so as to generate coded data. The eNB performs rate matching according to the number of CCEs allocated to a PDCCH format. Thereafter, the eNB modulates the coded data so as to generate modulated symbols. In addition, the eNB maps the modulated symbols to physical resource elements.

3GPP (3rd Generation Partnership Project) may refer to the next-generation wireless communication system as the LTE-A system, such that it can satisfy a future-oriented service request. The LTE-A system employs carrier aggregation (CA) technology, and multiple component carriers (CCS) are aggregated for transmission, such that a transmission bandwidth of a UE is increased and the use efficiency of a frequency is also increased. The LTE-A system simultaneously combines multiple carriers instead of a single carrier used in the legacy LTE Rel 8/9, and uses the combined carriers, such that the bandwidth can be extended up to 100 MHz. In other words, a carrier defined up to a maximum of 20 MHz in the legacy LTE Rel 8/9 is re-defined as a component carrier (or a component carrier), such that one UE can use a maximum of 5 component carriers (CCs) using carrier aggregation technology.

The current carrier aggregation (CA) (or carrier integration) technology has the following characteristics.

(1) Aggregation of contiguous component carriers (CCs) is supported, and aggregation of non-contiguous CCs is supported.

(2) The number of UL carrier aggregations (CAs) may be different from the number of DL CAs. If it is necessary for the current CA technology to be compatible with the previous system, UL and DL must configure the same number of CCs.

(3) Different numbers of CCs are configured in UL and DL such that different transmission bandwidths can be obtained.

(4) In association with the UE, each CC independently transmits one transport block, and an independent hybrid automatic repeat request (HARQ) mechanism is used.

Differently from the legacy LTE system designed to use one component carrier (CC), it is necessary for a carrier aggregation (CA) system using a plurality of CCs to effectively manage component carriers (CCs). In order to effectively manage CCs, the CCs can be classified according to their roles and characteristics. CCs may be classified into a primary component carrier (PCC) and a secondary component carrier (SCC). The PCC is used as a center component carrier of CC management when multiple CCs are used, and one PCC is allocated to one UE.

Other CCs other than one PCC is defined as secondary component carriers (SCCs). The PCC is a kernel carrier that manages the entire integrated CCs, and the remaining SCCs may provide additional frequency resources to achieve a high transfer rate. For example, the eNode B may achieve RRC for signaling with a UE through a primary component carrier (PCC). Information for security and higher layer may also be achieved through a PCC. Indeed, if there is only one CC, the corresponding CC may be used as a PCC. In this case, the corresponding CC may perform the same role as a carrier of the legacy LTE system.

The eNode B may allocate an activated component carrier (ACC) from among multiple CCs to a UE. The UE recognizes the ACC allocated to the UE itself. In accordance with the present invention, the UE must report a power headroom (PH) to the eNode B according to each carrier of ACCs allocated to the UE itself. However, in association with an unscheduled carrier from among one or more ACCs allocated to the UE, the UE may transmit a virtual PHR to the unscheduled carrier.

In order to allow the UE to perform a power headroom report according to the CA technology applied to the LTE-A system, a method for allowing the eNode B to signal a power control message to the UE will hereinafter be described in detail.

In accordance with the current standards (3GPP TS 36.321, 36.213, 36.133), medium access control (MAC) elements transmitted from the UE include a buffer status report (BSR) control element and a power headroom report (PHR) control element. The BSR control element is generated by a buffer status report process, such that it reports the amount of data contained in an uplink buffer to the eNB acting as the service provider. The PHR control element is generated by the PHR process, such that the UE reports a current power status (i.e., the amount of remaining power) to the eNB. The eNB can effectively distribute radio resources according to information regarding both a UE-reported uplink buffer status and a power headroom, and can also decide scheduling.

Generally, the UE can trigger the power headroom report (PHR) in case of generating the following events (1) and (2).

(1) A timer (prohibitPHR-Timer) for prohibiting the power headroom report stops operation, and the change of transmission path loss using a UE is greater than a predetermined value (DL_PathlossChange).

(2) If a periodic report timer (PeriodicPHR-Timer) has expired, this situation is referred to as a periodic PHR. After the power headroom report is generated, assuming that the UE includes newly-transmitted uplink transmission resources distributed by the eNB in a current transmission time period, the PHR control element is generated from the power headroom value obtained from a physical layer, and the timer (prohibitPHR-Timer) is driven again.

Besides, provided that the periodic power boundary headroom report is generated, the periodic report timer (PeriodicPHR-Timer) is driven again. In association with the detailed operations of the power headroom report (PHR) process, it may be necessary to refer to associated technology standards (3GPP TS 36.321, 36.213, 36.133).

Equation 1 defines a power headroom (PH) of a UE valid in a subframe of an index (i).

$$PH(i) = P_{CMAX} - \{10 \log_{10}(M_{PUSCH}(i)) + P_{O\_PUSCH}(j) + \alpha(j) \cdot PL + \Delta_{TF}(i) + f(i)\} [dB]$$ [Equation 1]

In Equation 1, $P_{CMAX}$ is a transmission power of a configured UE, and $M_{PUSCH}(i)$ is a parameter indicating a PUSCH resource allocation bandwidth denoted by the number of resource blocks (RBs) valid in the subframe indexed with (i). Specifically, $M_{PUSCH}(i)$ is allocated by the eNode B.

$P_{O\_PUSCH}(j)$ is a parameter indicating the sum of a cell-specific norminal component $P_{O\_NOMINAL\_PUSCH}(j)$ provided from a higher layer and a UE-specific component $P_{O\_UE\_PUSCH}(j)$ provided from a higher layer. The eNode B informs the UE of the parameter $P_{O\_PUSCH}(j)$. $\alpha(j)$ is a cell-specific parameter, that is provided from a higher layer and is then transmitted in units of 3 bits by the eNode B. In case of j=0 or j=1, $\alpha \in \{0, 0.4, 0.5, 0.6, 0.7, 0.8, 0.9, 1\}$ is achieved. In case of j=2, $\alpha(j)=1$ is achieved. $\alpha(j)$ is transmitted from the eNode B to the UE.

'PL' is a downlink pathloss (or downlink signal-loss) estimation value calculated in units of a dB by a UE, and is denoted by 'PL=referenceSignalPower-higher layer filteredRSRP'. f(i) is a value indicating a current PUSCH power control adjustment state, and may be denoted by a current absolute value or an accumulation value.

The power headroom (PH) is composed of 64 levels ranging from −23 dB to 40 dB, and each level has an interval of 1 dB. The PH is transferred from a physical layer to a higher layer. PH MAC control element is identified by a MAC PDU subheader. The following Table 5 shows an example of a power headroom (PH) that is reported to the eNode B by the UE.

TABLE 5

| PH | Power Headroom Level |
| --- | --- |
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

Since the carrier aggregation (CA) technology is introduced into the LTE-A system serving as the next generation communication system, there is needed a method for reporting a power headroom (PH) in a multi-carrier system. The number of CCs described in the present invention may be set to 1 or an aggregate (or a band) of several contiguous or non-contiguous CCs.

In order to satisfy single-carrier characteristics in the LTE system, a UE does not simultaneously transmit PUCCH and PUSCH on uplink. However, multiple carriers are introduced into the LTE-A system, such that the UE can simultaneously transmit PUCCH and PUSCH. Therefore, since the UE can simultaneously transmit PUCCH and PUSCH, it is necessary to define an additional PH. In addition, PH needs to be defined per CC of multiple uplink CCs. In addition, with the introduction of multiple carriers, a method for reducing uplink signaling overhead in configuring the PH is also needed.

The LTE-A system can define a power headroom (PH) for PUSCH and a power headroom (PH) for PUCCH.

Provided that a PHY event occurs, if PUSCH transmission is decided, the UE transmits a power headroom report (hereinafter referred to as 'PHR_pusch') for PUSCH to the eNode B. If PUCCH transmission is decided on the condition that the next PHR event occurs, the UE transmits a power headroom report (hereinafter referred to as 'PHR_pucch' for PUCCH to the eNode B. In addition, provided that the UE simultaneously transmits PUSCH and PUCCH in a subsequent process and a PHR event also occurs, the UE simultaneously reports 'PHR_pusch' and 'PHR_pucch' to the eNode B. Definition of PHR_pusch and PHR_pucch may be changed according to individual situations on the basis of the following equation. However, although each of the two terms 'PHR_pusch' and 'PHR_pucch' may be expressed in different ways as necessary, it should be noted that their meaningful essentials are identical to each other.

The following equation 2 shows that Equation 1 is extended to a multiple component carrier system such that a power headroom report (PHR) can be sent to each UL CC.

$$PH_{PUSCH,c}(i) = P_{CMAX,c} - \{10 \log_{10}(M_{PUSCH,c}(i)) + P_{O\_PUSCH,c}(j) + \alpha_c(j) \cdot PL_c + \Delta_{TF,c}(i) + f_c(i)\}$$ [Equation 2]

In Equation 2, c is an index of a component carrier (CC).

The following equation 3 shows that a PUCCH power control equation is extended to a multiple UL CC system.

$$P_{PUCCH}(i) = \min\{P_{CMAX}, P_{O\_PUCCH} + PL + h(n_{CQI}, n_{HARQ}) + \Delta_{F\_PUCCH}(F) + g(i)\}$$ [Equation 3]

$$P_{PUCCH,c}(i) = P_{CMAX,c} - \{P_{O\_PUCCH,c}(j) + PL_c + h_c(n_{CQI}, n_{HARQ}) + \Delta_{F\_PUCCH,c}(F) + g_c(i)\}$$ [Equation 4]

In Equation 4, c is an index of a component carrier (CC).

Equation 4 shows PH definition for PUCCH in the same manner as in Equation 2.

Figure 6:
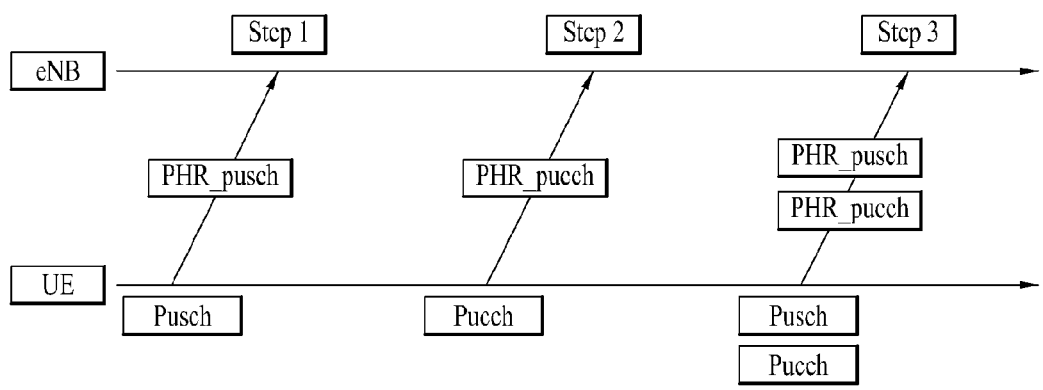
FIG. 6 shows an example of a PH configuration reported from a UE to an eNode B.

FIG. 6 shows an example of a PH configuration reported from a UE to an eNode B.

Referring to FIG. 6, if the UE receives scheduling for PUSCH transmission from the eNode B (Step 1) and transmits 'PHR_pusch' to the eNode B, the eNode B can recognize not only PUSCH resources allocated to the UE but also surplus power of an MCS (Modulation and Coding Scheme) level. In this case, since the eNode B has difficulty in predicting PUCCH transmission power of the UE, it is difficult to simultaneously allocate PUSCH and PUCCH when the eNode B performs scheduling. Despite the above-mentioned problems, provided that the eNode B simultaneously allocates PUSCH and PUCCH, a part where it is difficult to perform PUCCH prediction is used as a margin of PUSCH power, resulting in the occurrence of a damage caused by PUSCH. As can be seen from Equation 1, a PUSCH transmit power control (TPC) command transmitted from the eNode B to the UE may be transmitted as an absolute value and/or an accumulation value.

If $f_c(i)$ is operated as an absolute value in the UE, the eNode B can analogize pathloss (PL) information on the basis of 'PHR_pusch' reported by the UE. In contrast, if $f_c(i)$ is operated as an accumulation value in the UE, the eNode B can recognize information of $(PL+f_c(i))$. Provided that $f_c(i)$ is set to the accumulation value, there may be a difference between a value calculated by the eNode B and another value actually calculated by the UE due to a TPC command error. Due to the above-mentioned reasons, a power headroom report (PHR) is needed.

In so far as the UE does not report the 'pathloss' value to the eNode B, the eNode B has difficulty in estimating PUCCH transmission power on the basis of one PHR_pusch information reported by the UE. If $g_c(i)$ for PUCCH is accumulated, the eNode B also has difficulty in estimating such PUCCH transmission power. In the LTE(rel-8) system, PUSCH may be operated at any one of an absolute value and an accumulation value, and PUCCH may be operated only at the accumulation value.

At a location between step 1 and step 2 of FIG. 6, the eNode B may have difficulty in simultaneously allocating PUSCH and PUCCH to one UL CC or multiple UL CCs of a UE. Provided that the eNode B schedules PUCCH transmission for a UE at a time where a PHR event occurs, the UE transmits 'PHR_pusch' to the eNode B. In this case, the eNode B may analogize information regarding 'pathloss+$g_c(i)$' using the 'PHR_pucch' information. In this case, the eNode B also has difficulty in estimating a PUSCH transmission power level (in the case in which $f_c(i)$ is accumulated. In the same manner as in other steps subsequent to step 1, the eNode B must simultaneously transmit/allocate data or information to the UE after execution of step 2.

In Step 3, provided that the eNode B schedules simultaneous transmission of PUSCH and PUCCH to the UE at a time where a PHR event occurs, the UE simultaneously transmits 'PHR_pusch' and 'PHR_pucch' to the eNode B. In the LTE-A system, the UE can simultaneously transmit PUSCH and PUCCH at a PCC. Therefore, it is necessary for the UE to transmit PHRs for PUSCH and PUCCH to the eNode B at a PCC. Since the UE transmits a power headroom report (PHR) to the eNode B, the eNode B can recognize resources actually allocated to the UE, associated MCS level, and a power level actually transmitted for a PUCCH format, such that the eNode B can be free from the scheduling issue for the next transmission. Therefore, PHR transmission shown in FIG. 6 may have difficulty in solving the essential problems encountered when a multiple UL CC system reports a PH.

When constructing a downlink (DL) and uplink (UL) based on a multi-carrier system, the UE needs to report power state information of each UL carrier to the eNode B, such that the eNode B can easily decide the UE's resource allocation opportunity and size using the reported power state information. In addition, the UE can simultaneously transmit PUCCH (ACK/NACK, CQI(Channel Quality Indicator), SR(Scheduling Request), PMI(Precoding Matrix Index), etc.) and PUSCH at a single UL carrier (e.g., PCC). Preferably, the UE may transmit a PUCCH power headroom (PH) and a PUSCH power headroom (PH) at the corresponding UL CC according to individual formats (e.g., PHR MAC CE of LTE Rel 8/9).

As can be seen from Equation 1, 'Pmax-pusch' is composed of 64 levels ranging from −23 dB to 40 dB, each level has an interval of 1 dB. Likewise, a power level calculated by a PUCCH power control equation can be applied to a PUCCH PHR in the same manner as in PUSCH definition. DL pathloss can be calculated in various ways, and it should be noted that DL pathloss' of the present invention can be calculated by any of the various methods. In the LTE(rel-8), PL is defined as 'referenceSignalPower—higher layer filteredRSRP' (i.e., PL=referenceSignalPower−higher layer filteredRSRP).

As described above, although the LTE Rel-8 system is unable to simultaneously transmit PUSCH and PUCCH, the multiple DL/UL CC system can enable the UE to simultaneously transmit PUCCH and PUSCH at each UL CC (e.g., PCC). Under this situation, the eNode B must decide whether to simultaneously transmit PUSCH and PUCCH on the basis of information requisite for the next transmission of a UE, must decide how to transfer PUSCH resource allocation and MCS level, must decide a method for allocating sufficient power to PUCCH, and must decide a method for simultaneously transmitting several PUCCHs at one or more UL CCs. For these purposes, the following methods need to be considered.

In the case in which each of PHR_pusch and PHR_pucch is defined in the LTE-A system and a PHR event occurs, the UE must report PHR_pusch and/or PHR_pucch for each activated component carrier (ACC) to the eNode B. The above-mentioned operation must be carried out regardless of whether the UE transmits PUSCH and PUCCH at the same TTI (Transmit Time Interval)/subframe/frame (i.e., reference time for PHR calculation). By the above-mentioned methods, the eNode B can increase the degree of scheduling freedom requisite for the next transmission for the corresponding UE.

The eNode B can decide whether to simultaneously allocate PUSCH and PUCCH to the next transmission using the reported PHR information, and can also decide the above-mentioned scheduling issues, resulting in an increase in reliability. In addition, the eNode B can minimize the maximum (Max) power limitation of the UE when allocating multiple UL transmission channels, and can also reduce a burden of necessary complicated processes PHR_pusch can be represented by Equation 2, and PHR_pucch can be represented by Equation 4. As a result, PUSCH of the legacy LTE Rel-8 can be maximally reused. In this case, the UE receives different PUSCHs from the eNode B upon simultaneously receiving PHR_pusch and PHR_pucch from the eNode B, and transmits the received PUSCHs. Otherwise, the UE may also receive one PUSCH resource and transmit it. In addition, the UE may integrate two information pieces into one new PHR configuration, and transmit the resultant PHR configuration as necessary.

Besides, the eNode B wants to recognize not only a 'pathloss' component requisite for UE's PHR transmission but also the accumulated components $f_c(i)$ and $g_c(i)$, such that the UE may transmit a PHR as represented by the following equations 5 and 6.

$$PH_{PUSCH,c}(i) = \{\alpha \times PL_c + f_c(i)\} \qquad \text{[Equation 5]}$$

$$PH_{PUCCH,c}(i) = \{PL_c + g_c(i)\} \qquad \text{[Equation 6]}$$

If the UE constructs power headroom (PH) equations as shown in Equations 5 and 6, much more information is needed as compared to the case in which the report range is configured as shown in Equation 2 or 4. Therefore, the UE can configure a PH as shown in the following equations 7 and 8, and can report the configured PH.

$$PH_{PUSCH,c}(i) = P_{CMAX,c} - \{P_{O\_PUSCH,c}(j) + \alpha_c(j) \cdot PL_c + f_c(i)\} \qquad \text{[Equation 7]}$$

$$PH_{PUCCH,c}(i) = P_{CMAX,c} - \{P_{O\_PUCCH,c}(j) + PL_c + g_c(i)\} \qquad \text{[Equation 8]}$$

Alternatively, after the UE configures Equations 7 and 8, the UE may transmit a value of the rear part of $P_{cmax,c}$ as shown in Equations 5 and 6.

If the UE configures a PH as shown in Equations 7 and 8, the actual transmission case shown in step 1 of FIG. 6 exists in the PUSCH, such that there is needed additional definition indicating what PUCCH transmission power is. Likewise, in step 2, PUCCH transmission power can be recognized, but additional definition is needed to acquire PUSCH transmission power. However, provided that the UE configures the PH as shown in Equations 5, 6, 7 and 8, additional definition is no longer required.

In addition to the above-mentioned method, provided that both $g_c(i)$ for PUCCH and $f_c(i)$ for PUSCH are operated at an absolute value, if the UE reports only one of PHR_pusch and PHR_pucch, the transmission power of the other one can be estimated.

In addition, provided that $f_c(i)$ for PUSCH is operated at an absolute value and $g_c(i)$ for PUCCH is operated at an accumulation value, the UE may configure 'PHR_pusch' and 'PUCCH $g_c(i)$' values and report the configured 'PHR_pusch' and 'PUCCH $g_c(i)$' values to the eNode B as necessary. The above-mentioned case may be considered to be the same as in step 1 of FIG. 6. In this case, all definitions described above may be applied to 'PHR_pusch'. In step 1, it is preferable that $g_c(i)$ is set to the latest value calculated by the UE. In step 2 of FIG. 6, the UE may add the $g_c(i)$ value as well as 'PHR_pusch', and report the added result as necessary. In this case, $g_c(i)$ may be an updated value. Although the aforementioned all definitions can be applied to 'PHR_pusch', it is not necessary to additionally define a method for simultaneously employing Equations 5 and 7. In case of using Equation 1, $M_{PUSCH,c}(i)$ and $\Delta_{TF,c}(i)$ recognized by the UE and the eNode B may be basically utilized, or both the UE and the eNode B must mutually recognize values signaled by the eNode B according to the power control equation. Otherwise, it is difficult for the eNode B to discriminate (or identify) each signaled value only using the calculated PUSCH transmission power.

In addition, operations for use in the $f_c(i)$ and $g_c(i)$ accumulation modes may be considered. In step 1 of FIG. 6, a PHR event occurs in PUSCH transmission, such that $f_c(i)$ of Equation 2 used for calculating 'PHR_pusch' may be set to zero on the condition that the UE transmits a PHR. In addition, each of $f_c(i)$ and $g_c(i)$ may be reset to zero or an arbitrary value at a specific time where the corresponding value is received by the eNode B. The eNode B can analogize the pathloss component on the basis of the resultant PHR_pusch value calculated by the UE according to the above-mentioned method, such that the eNode B can be operated with only one PHR. As a result, signaling overhead can be greatly reduced.

Figure 7:
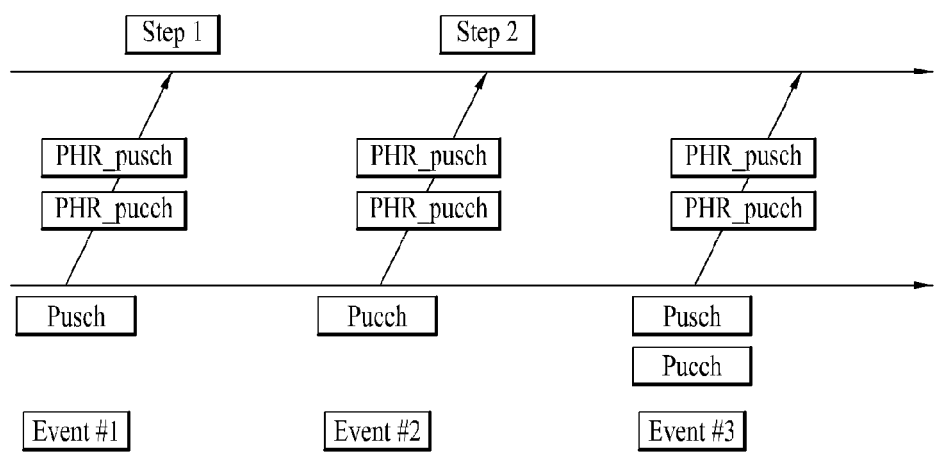
FIG. 7 shows another example of a PH configuration reported from a UE to an eNode B.

FIG. 7 shows another example of a PH configuration reported from a UE to an eNode B.

Referring to FIG. 7, when each of PHR events 1, 2 and 3 occurs, a method for allowing a UE to construct transmission of PH information is needed. Four methods (Methods 1 to 4) for constructing PH information according to the occurrence of PHR events shown in FIG. 7 will hereinafter be described in detail.

A first method (Method 1) will hereinafter be described in detail.

Provided that the UE receives resources for PUSCH transmission from the eNode B or transmits a PUSCH at a specific time where the UE generates an event 1, the UE simultaneously includes a PHR of a PUSCH and a PHR of a PUCCH in PUSCH information, and transmits the resultant PHRs. For example, the UE configures (PUSCH PHR MAC control elements+their subheaders) or configures (PUSCH PHR MAC control element information based on a value reported by a physical layer+subheaders) or PUCCH PHR MAC control element information based on a value reported by a physical layer, such that the UE can simultaneously transmit the configured results. Of course, it is necessary to define a method for calculating transmission power because the UE does not transmit a PUCCH. In this case, new pathloss (PL) variation must be reflected into a power control equation of a previously transmitted PUCCH.

As the simplest example, the UE may add/configure the newly calculated PL component. Alternatively, a previous PL component and 'ΔPL' of an event occurrence moment may be reflected such that the resultant PH information can be configured. Provided that the latest transmission PUCCH is not definitely defined, one of PUCCH formats may be decided and used. For this purpose, a predetermined value may be basically used as necessary.

Next, the event 2 situation means that a UE receives PUCCH scheduling information or transmits a PUCCH although a PHR event occurs. In this case, the UE is unable to transmit PHR information to a PUCCH, such that it configures PH information at the next PUSCH transmission moment (for example, the foremost PUSCH) and transmits the configured PH information to the eNode B. In this case, a PHR delay inevitably occurs. Therefore, in order to minimize the PHR delay, it is preferable that the UE may also transmit the configured PH information to the foremost PUSCH. Alternatively, when the UE transmits a PUSCH allocated at the event generation time point at another UL CC, the UE may also transmit carrier index information and PHR_pusch/PHR_pucch using the implicit or explicit distinction method.

Of course, the implicit and explicit mapping method for discriminating between PHR_pusch and PHR_pucch may also be predetermined as necessary.

In this case, since the UE does not perform actual transmission of PUSCH, a value notified by the eNode B from among the power control equation shown in the event 2 may be predetermined and used, and PUSCH transmission power can be calculated using the passloss (PL) value and the accumulated TPC command value.

At a specific moment where the event 3 occurs as shown in FIG. 7, the UE may configure a PH for PUSCH in the same manner as in the event 1 and transmit the configured PH. In this case, the transmission power level calculated by the UE may utilize a transmission power level of PUSCH/PUCCH to be transmitted at the specific moment. Alternatively, information signaled from the eNode B may be set to a basic value as described above, and the UE may also transmit the resultant value to which the PL value and the accumulated TPC command value are applied as necessary. Alternatively, in addition to the method for simultaneously transmitting PHR_pusch and PHR_pucch by the UE, the present invention may also implement another method for separating information for the next PUSCH according to time order and then sending the separated information. However, the method for discriminating between PHR_pusch and PHR_pucch according to time order or configuring an UL CC index may be explicitly or implicitly implemented in the present invention.

A second method (Method 2) will hereinafter be described in detail.

Referring to FIG. 7, according to Method 2, when the UE receives PUCCH transmission scheduling or a PHR event occurs at a PUCCH transmission time point, the UE may omit the process for performing a PHR for the eNode B. The remaining processes other than the above-mentioned process are identical to those of the Method 1. That is, in order to maintain the PHR execution concept, PUSCH transmission must be carried out at a time point where a PHR event occurs as in the legacy LTE rel-8 system. However, whereas a UE for use in the legacy system can transmit only PHR_pusch information, the UE for use in the present invention transmits two information pieces (i.e., PUSCH PHR and PUCCH PHR) to the eNode B before the next PHR event occurs in the same manner as in the Method 1.

A third method (Method 3) will hereinafter be described in detail.

Figure 8:
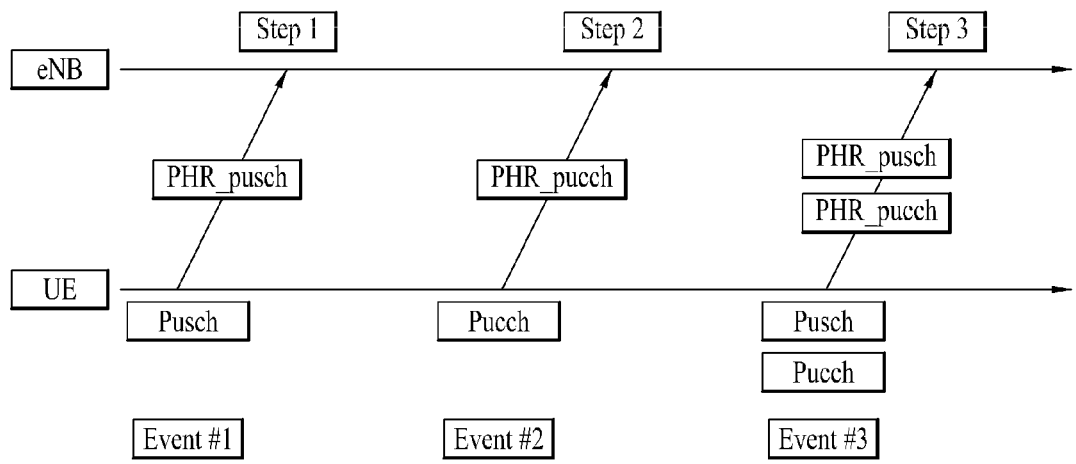
FIG. 8 shows still another example of a PH configuration reported from a UE to an eNode B.

FIG. 8 shows still another example of a PH configuration reported from a UE to an eNode B.

Differently from FIG. 7, if a PHR event 1 occurs when the UE transmits a PUSCH or receives PUSCH scheduling as shown in FIG. 8, the UE transmits only PHR_pusch information to the eNode B. If a PHR event 2 occurs when the UE transmits a PUCCH or receives PUCCH scheduling, the UE transmits only PHR_pucch information. If a PHR event 3 occurs when the UE transmits a PUSCH or PUCCH or receives scheduling information, the UE may transmit PHR_pusch and PHR_pucch.

In this case, due to some problems encountered in the legacy LTE rel-9 system, a method for transmitting a PHR under the event 2 situation is needed. In this case, the UE may simultaneously transmit PHR_pucch information and the latest PUSCH to be transmitted in a subsequent process as shown in Method 1, or may transmit the PHR_pucch information to another UL CC PUSCH belonging to the same time zone. Alternatively, the UE may omit PHR_pucch of PUCCH as shown in Method 2. In this case, a method for constructing additional PHR MAC control information in a PUCCH in the same manner as in a PUSCH may also be considered. In Method 2, the event 2 may be excluded as necessary.

A fourth method (method 4) will hereinafter be described in detail.

A method for constructing two information pieces in one PUSCH or one PUCCH from among contents mentioned in the aforementioned Methods 1 to 3 may be considered and used as follows.

According to a method for allowing the UE to simultaneously construct/transmit a separate PHR, if a PHR event occurs, the UE may transmit PHR_pusch and PHR_pucch at one UL CC PUSCH or one UL CC PUCCH, or may transmit PHR_pusch and PHR_pucch at another UL CC to which PUSCH is allocated. In this case, carrier index information corresponding to PHR_pusch and PHR_pucch may be transmitted in different ways according to a distinction between PHR_pusch and PHR_pucch. In this case, the explicit or implicit method may be used to discriminate between PHR_pusch and PHR_pucch. The explicit or implicit method may be predetermined as necessary. Alternatively, the explicit or implicit method may be extended such that a carrier index may be included in a PHR as a default as necessary.

Alternatively, the UE may configure one format or one information of PHR_pusch and PHR_pucch in the form of a combined or included structure, such that the UE transmits one PHR. However, the eNode B may implicitly or explicitly analogize two PHRs. If a carrier for enabling the UE to transmit a PUCCH is limited (for example, if an anchor CC or primary CC is used), the UE transmits one PHR for the remaining carriers other than the corresponding carrier, but it should be noted that the above-mentioned UE operation may be interpreted in different ways as necessary. That is, although the UE transmits two information pieces (PHR_pusch and PHR_pucch) using one format, the eNode B may interpret the corresponding information in different ways as necessary. A new PHR format (or a new PHR table and/or equation) may be configured, or a legacy format (or a legacy PHR table and/or equation) may be reconfigured as necessary.

The UE may separately configure necessary information according to time order, and may transmit the configured information. The UE may separately transmit necessary information at the corresponding UL CC according to time order, or may also transmit necessary information in another time zone instead of the same time zone at another UL CC. In this case, when the UE separately transmits necessary information according to time order, it may be preferable that the corresponding information is transmitted to the two fastest (or foremost) PUSCHs (or PUCCH, or a hybrid format of PUCCH and PUCCH).

The above-mentioned contents may be independently applied to multiple DL/UL component carrier (CC) system without difficulty. From among the above-mentioned contents, an UL CC through which a PUCCH is transmitted may be an anchor CC (or PCC).

Alternatively, the UE may transmit PHR_pucch information only in the anchor CC (or PCC). Under the aforementioned scenario, if a PHR event occurs in the anchor CC (or PCC), the UE may transmit two information pieces (PHR_pusch and PHR_pucch) to the eNode B, and may transmit PHR_pusch information only in another UL CC, such that PHR_pusch of the LTE rel-8 may be reused as necessary. As a result, signaling overhead generated when two PHR information pieces are reported in all UL CCs may be greatly reduced.

As described above, PUCCH transmission and PUCCH transmission may not simultaneously occur in the LTE system. Therefore, the present invention considers that multiple UL data transmission operations can be simultaneously carried out, and provides a method for enabling the UE to be efficiently operated in multiple carriers but not a single carrier.

Equation 9 is a power control equation of PUSCH, and Equation 10 is a power control equation of PUCCH.

$$P_{PUSCH}(i) = \min\{P_{CMAX}, 10 \log_{10}(M_{PUSCH}(i)) + P_{O\_PUSCH}(j) + \alpha(j) \cdot PL + \Delta_{TF}(i) + f(i)\} dBm \quad \text{[Equation 9]}$$

$$P_{PUCCH}(i) = \min\{P_{CMAX}, P_{0\_PUCCH} + PL + h(n_{CQI}, n_{HARQ}) + \Delta_{F\_PUCCH}(F) + g(i)\} dBm \quad \text{[Equation 10]}$$

Equation 1 is based on a single carrier. If the single carrier is extended to multiple carriers (multi-carrier), the simplest method for representing a power headroom report (PHR) reported by the UE per carrier of multiple carriers may be achieved by adding a carrier index value to all parameters shown in Equations 9 and 10.

Unique parameter values may be assigned to respective carriers, and the eNode B may define/signal values requisite for the UE according to individual carriers. A specific parameter may be carrier-specifically defined, and a specific parameter may be carrier-commonly defined. Although the LTE-A system decides a specific-type power control equation using multiple carriers, the present invention can be applied to the LTE-A system.

One $P_{CMAX}$ is basically used in a single carrier. However, in the case of using multiple carriers or multiple antennas, a maximum power value is assigned to each carrier, such that the same or different maximum power values may be assigned to individual carriers or the same or different maximum power values may be assigned to individual antennas. Therefore, a maximum power value may be assigned to each carrier or antenna according to various scenarios, and each maximum power value may be established within a predetermined range not exceeding the UE's maximum transmission power. Otherwise, such a maximum power value may also be determined to be a predetermined value notified by the eNode B. PH report may be defined in different ways according to various system scenarios. The UE's PH report will hereinafter be described on the assumption of the following cases (or situations).

In a first case (Case 1), the case of multiple carriers will hereinafter be described. In more detail, according to Case 1, the same maximum power is assigned to a single antenna or respective antennas, such that the following process may be applied to respective antennas or the following process may be applied to each carrier irrespective of the same or different maximum power for individual antennas.

Provided that the UE simultaneously transmits PUCCH and PUSCH, the UE may decide $P_{PUCCH}$ and $P_{PUSCH}$ using Equations 9 and 10 (or arbitrary power control equations). In this case, $P_{PUCCH}$ and $P_{PUSCH}$ values may also exceed maximum power assigned for each carrier as necessary.

Figure 9:
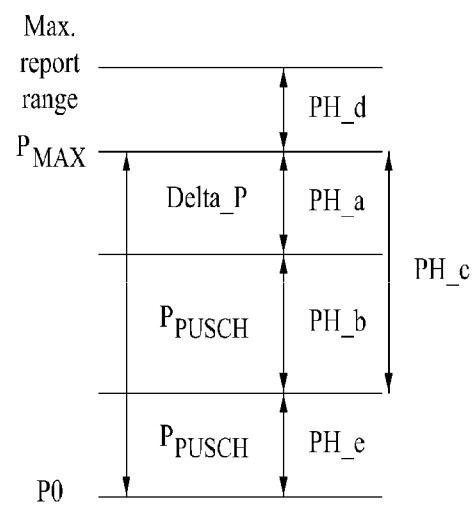
FIG. 9 shows an example of a PH configuration at an arbitrary specific carrier for use in a multi-carrier support communication system.

FIG. 9 shows an example of a PH configuration at an arbitrary specific carrier for use in a multi-carrier support communication system.

Referring to FIG. 9, if $P_{PUCCH}$ calculated before $P_{PUCCH}$ is compared with $P_{MAX}$ does not exceed $P_{MAX}$, the UE transmits 'PH_c' indicating a PUCCH power headroom (PH). If $P_{PUCCH}$ exceeds $P_{MAX}$, the UE reports a value belonging to the 'PH_d' range of a surplus to the eNode B. Provided that the UE transmits a PH for PUSCH and $P_{PUSCH}$ does not exceed '$P_{MAX}$', the UE reports a value denoted by (PH_a+ PH_e). If $P_{PUSCH}$ exceeds '$P_{MAX}$', the UE reports a value belonging to the PH_d range of a surplus to the eNode B. Not only in the method for transmitting a PH over each of PUCCH and PUSCH, but also in the method for separately transmitting one PH over PUCCH and PUSCH, the UE must report a value belonging to the 'Delta_P' or 'PH_d' range as shown in FIG. 9.

A power headroom (PH) can be defined according to the $P_{MAX}$ condition of the above-mentioned Case 1.

1. In case of using one $P_{MAX}$ value:

$$PH_{PUSCH} = P_{MAX} - \sum_{n=1}^{C} P_{PUSCH}(n) \quad \text{[Equation 11]}$$

$$PH_{PUCCH} = P_{MAX} - \sum_{n=1}^{C} P_{PUCCH}(n) \quad \text{[Equation 12]}$$

$$PH = P_{MAX} - \left(\sum_{n=1}^{C} P_{PUSCH}(n) + \sum_{n=1}^{C} P_{PUCCH}(n)\right) \quad \text{[Equation 13]}$$

In Equations 11 to 13, C is a total number of UL carriers that must be reported by the UE. In this case, each of $P_{PUSCH}(n)$ and $P_{PUCCH}(n)$ may be obtained before each of $P_{PUSCH}(n)$ and $P_{PUCCH}(n)$ is compared with $P_{MAX}$.

In three PH definitions shown in Equations 11 to 13, a combination of available methods, each of which can be reported from the UE to the eNode B, may be used as follows. The UE may transmit any one of Equation 11, Equation 12 and Equation 13, or may simultaneously transmit only two (e.g., Equation 11 and Equation 13) of Equations 11 to 13 as necessary. Therefore, since the UE can simultaneously transmit PUSCH and PUCCH at a PCC, the UE may inform the eNode B of all PHs corresponding to Equations 11 and 13 at the PCC.

The above-mentioned method may be equally applied to several $P_{MAX}$ values.

2. Case in which $P_{MAX}$ exists per carrier (carrier index k):

If $P_{MAX}$ exists per carrier, the UE may configure Equations 14 to 16.

$$PH_{PUSCH}(k) = P_{MAX}(k) - P_{PUSCH}(k) \quad \text{[Equation 14]}$$

$$PH_{PUCCH}(k) = P_{MAX}(k) - P_{PUCCH}(k) \quad \text{[Equation 15]}$$

$$PH(k) = P_{MAX}(k) - (P_{PUSCH}(k) P_{PUCCH}(k)) \quad \text{[Equation 16]}$$

In Equations 14 to 16, each of $P_{PUSCH}(k)$ and $P_{PUCCH}(k)$ may be obtained before being compared with $P_{MAX}(k)$. In this case, the UE may arbitrarily report any one of Equations 14 to 16, or may report two arbitrary equations from among Equations 14 to 16. The UE can simultaneously transmit PUSCH and PUCCH at a PCC. Specifically, the UE may inform the eNode B of all PHs corresponding to Equations 14 and 16 at a PCC. In this case, Equation 14 used when the UE reports a power headroom (PH) to the eNode B may be defined as first-type power headroom (PH) information, and Equation 16 may be defined as second-type PH information. The above-mentioned methods may also be applied to one $P_{MAX}$ value.

Transmitting a PH to each carrier by the UE may increase signaling overhead, such that the overhead can be reduced by the following methods (1) to (6).

(1) The UE may report a PH of an UL primary carrier (or an UL carrier linked to a DL primary carrier). (2) UE may transmit a PH to each UL carrier linked to the UL primary carrier (or DL primary carrier), or may report a PH of all carriers (or the remaining carriers other than the UL primary carrier) to the eNode B. (3) UE may also report the highest or smallest PH value from among PH values of individual carriers as well as a carrier index or to the exclusion of the carrier index. (4) UE may transmit a PH of UE-specific or carrier-specific signaled carrier(s) or a PH of implicitly recognized carrier(s) (for example, a PH of carriers each having the highest $P_{MAX}$ from among carriers or a PH of carriers each having the smallest $P_{MAX}$ from among carriers), or may simultaneously transmit the above-mentioned PHs as necessary. (5) Each UE can recognize PUCCH and PUSCH allocation for each carrier through a UL grant, such that each carrier does not always transmit PHs of PUCCH and PUSCH, and may report a PH of a channel actually transmitted per carrier. For example, if a PUCCH is transmitted in Carrier 1 and a PUSCH is transmitted in Carrier 2, the UE may report a PH of PUCCH to the eNode B at Carrier 1 and may report a PH of PUCCH to the eNode B at Carrier 2. (6) UE may transmit a PH of PUSCH to each carrier, and may report one PH of PUCCH to all carriers each transmitting the PUCCH (alternatively, PUCCH may be transmitted only in a UL primary carrier, and PH may be reported only in the UL primary carrier). In contrast, the UE may transmit a PH of PUCCH according to each carrier, and may report one PH of PUSCH for all carriers each transmitting the PUSCH.

According to the PH reporting method of the UE, if the report for each multi-carrier is defined, a space as large as carrier index information needs to be guaranteed in Table 5.

The above-mentioned method may also be applied to other parts as necessary. Provided that one or more $P_{MAX}$ values of the UE are fixed, a maximum power for each antenna or each carrier may be divided/redefined within the one or more $P_{MAX}$ values. First of all, one $P_{MAX}$ value may be used irrespective of the number of antennas, or different maximum powers may be established in individual carriers. If the $P_{MAX}$ value is fixed per carrier, the fixed $P_{MAX}$ value may be far from efficient in terms of power utilization. In more detail, if the PH_carrier_index value exceeds the negative (−) value a predetermined number of times during a predetermined time period, much power may be assigned to the corresponding carrier, such that insufficient or surplus power encountered between carriers can be solved.

Next, the case of multiple antennas (i.e., Case 2) will hereinafter be described in detail. In more detail, since one maximum power is established in a single carrier or individual carriers, the following process may be applied to individual carriers or the following process may also be applied to individual antennas irrespective of the same or different maximum powers assigned to individual carriers.

In case of a UE capable of employing multiple antennas, the UE may assign the same or different maximum power levels to individual antennas. The UE may perform PH reporting for each case according to individual antennas.

A power headroom (PH) may be defined according to the $P_{MAX}$ condition of Case 2, and a detailed description thereof will be given below.

1. In case of using one $P_{MAX}$ value (antenna index: k)

$$PH_{PUSCH} = P_{MAX} - \sum_{n=1}^{C} P_{PUSCH}(n) \qquad \text{[Equation 17]}$$

$$PH_{PUCCH} = P_{MAX} - \sum_{n=1}^{C} P_{PUCCH}(n) \qquad \text{[Equation 18]}$$

$$PH = P_{MAX} - \left(\sum_{n=1}^{C} P_{PUSCH}(n) + \sum_{n=1}^{C} P_{PUCCH}(n)\right) \qquad \text{[Equation 19]}$$

In Equations 17 to 19, C is a total number of antennas for which UE reporting is needed, and $P_{PUSCH}(n)$ and $P_{PUCCH}(n)$ may be obtained before each of $P_{PUSCH}(n)$ and $P_{PUCCH}(n)$ is compared with $P_{MAX}$.

The UE may configure any one of Equations 17 to 19 and report the configured equation to the eNode B. The UE may configure two arbitrary equations from among Equations 17 to 19, and select/report the configured equations to the eNode B. However, the UE can simultaneously transmit PUSCH and PUCCH at a PCC, such that the UE can report all PHs corresponding to Equations 17 and 19 to the eNode B at a PCC. In this case, Equation 17 used when the UE reports a PH to the eNode B may be defined as the first-type PH information, and Equation 19 may be defined as the second-type PH information. The above-mentioned methods may also be applied to several $P_{MAX}$ values.

2. Case in which $P_{MAX}$ exists in each antenna (antenna index: k)

$$PH_{PUSCH}(k) = P_{MAX}(k) - P_{PUSCH}(k) \qquad \text{[Equation 20]}$$

$$PH_{PUCCH}(k) = P_{MAX}(k) - P_{PUCCH}(k) \qquad \text{[Equation 21]}$$

$$PH(k) = P_{MAX}(k) - (P_{PUSCH}(k) + P_{PUCCH}(k)) \qquad \text{[Equation 22]}$$

In Equations 20 to 22, $P_{PUSCH}(k)$ and $P_{PUCCH}(k)$ may be obtained before each of $P_{PUSCH}(k)$ and $P_{PUCCH}(k)$ is compared with $P_{MAX}(k)$.

The UE may configure any one of Equations 20 to 22 for each antenna and then transmit the configured equation. Alternatively, the UE may configure two arbitrary equations from among Equations 20 to 22 and then transmit the configured equations to the eNode B. However, the UE can simultaneously transmit PUSCH and PUCCH at a PCC, suych that the UE can report all PHs corresponding to Equations 20 to 22 to the eNode B at a PCC. In this case, Equation 20 transmitted when the UE reports a PH to the eNode B may be defined as first-type PH information, and Equation 20 may be defined as second-type PH information. The above-mentioned methods may also be applied to one $P_{MAX}$ value.

Transmitting a PH to each carrier by the UE may greatly increase signaling overhead, such that the overhead can be reduced by the following methods (1) to (4).

(1) UE may transmit the highest or smallest PH value from among PHs for each antenna either along with an antenna index or to the exclusion of the antenna index to the eNode B. (2) UE may transmit a PH of UE-specific or carrier-specific signaled antenna(s) or a PH of implicitly recognized antenna(s) (for example, a PH of antennas each having the highest $P_{MAX}$ from among antennas or a PH of antennas each having the smallest $P_{MAX}$ from among antennas), or may simultaneously transmit the above-mentioned PHs as necessary. (3) Each UE can recognize PUCCH and PUSCH allocation for each antenna through a UL grant, such that each antenna does not always transmit PHs of PUCCH and PUSCH, and may report a PH of a channel actually transmitted per antenna. For example, if a PUCCH is transmitted in Antenna 1 and a PUSCH is transmitted in Antenna 2, the UE may report a PH of PUCCH to the eNode B at Antenna 1 and may report a PH of PUCCH to the eNode B at Antenna 2. (4) UE may transmit a PH of PUSCH for each antenna (per antenna), and may report one PH of PUCCH for all antennas each transmitting the PUCCH (alternatively, PUCCH may be transmitted only in one antenna, and PH of PUCCH transmitted to the antenna may be reported). In contrast, the UE may transmit a PH of PUCCH according to each carrier, and may report only one PH of PUSCH for all carriers each transmitting the PUSCH.

Next, a method for reporting a PH in case of multiple carriers or multiple antennas (Case 3) will hereinafter be described in detail. Different $P_{MAX}$ values may be assigned to individual antennas, or different $P_{MAX}$ values may be assigned to individual carriers. In the system employing different cell sizes and multiple carriers, different $P_{MAX}$ values may be assigned to individual carriers such that cell coverage can be satisfied. Of course, different $P_{MAX}$ values may be assigned to individual carriers under the condition that the same cell size and special purposes are used.

A power headroom (PH) for the above-mentioned case 3 may be defined according to the $P_{MAX}$ condition. The UE may configure equations for PH report as represented by the following equations 23 to 34.

$$PH_{PUCCH}(k,n) = P_{MAX}(k,n) - P_{PUCCH}(k,n) \quad \text{[Equation 23]}$$

$$PH_{PUCCH}(k) = P_{MAX}(k) - \sum_{n=1}^{C} P_{PUCCH}(k,n) \quad \text{[Equation 24]}$$

$$PH_{PUCCH}(n) = P_{MAX}(n) - \sum_{n=1}^{K} P_{PUCCH}(k,n) \quad \text{[Equation 25]}$$

$$PH_{PUCCH} = P_{MAX} - \sum_{k=1}^{K}\sum_{n=1}^{C} P_{PUCCH}(k,n) \quad \text{[Equation 26]}$$

$$PH_{PUSCH}(k,n) = P_{MAX}(k,n) - P_{PUSCH}(k,n) \quad \text{[Equation 27]}$$

$$PH_{PUSCH}(k) = P_{MAX}(k) - \sum_{n=1}^{C} P_{PUSCH}(k,n) \quad \text{[Equation 28]}$$

$$PH_{PUSCH}(n) = P_{MAX}(n) - \sum_{k=1}^{K} P_{PUSCH}(k,n) \quad \text{[Equation 29]}$$

$$PH_{PUSCH} = P_{MAX} - \sum_{k=1}^{K}\sum_{n=1}^{C} P_{PUSCH}(k,n) \quad \text{[Equation 30]}$$

$$PH(k,n) = P_{MAX}(k,n) - (P_{PUCCH}(k,n) + P_{PUSCH}(k,n)) \quad \text{[Equation 31]}$$

$$PH(k) = P_{MAX}(k) - \left(\sum_{n=1}^{C} P_{PUCCH}(k,n) + \sum_{n=1}^{C} P_{PUSCH}(k,n)\right) \quad \text{[Equation 32]}$$

$$PH(n) = P_{MAX}(n) - \left(\sum_{k=1}^{K} P_{PUCCH}(k,n) + \sum_{k=1}^{K} P_{PUSCH}(k,n)\right) \quad \text{[Equation 33]}$$

$$PH = P_{MAX} - \left(\sum_{k=1}^{K}\sum_{n=1}^{C} P_{PUCCH}(k,n) + \sum_{k=1}^{K}\sum_{n=1}^{C} P_{PUSCH}(k,n)\right) \quad \text{[Equation 34]}$$

In Equations 23 to 34, k is an antenna index, and n is a carrier index.

The UE may combine Equations 23 to 34 in various ways, and report the combination results to the eNode B. For example, the UE may transmit only one of Equations 23 to 26. In this case, if transmission of Equation 23 is achieved, the UE may report a PH for each carrier and a PH for each antenna. If transmission of Equation 24 is achieved, the UE may report a PH for each antenna. If transmission of Equation 25 is achieved, the UE may report a PH for each carrier. If transmission of Equation 26 is achieved, the UE may report one PH for each carrier index and one PH for each antenna index.

In another example, the UE may transmit any one of Equations 27 to 30, or may transmit any one of Equations 31 to 34. The UE may transmit any one of Equations 23 to 26 or any one of Equations 27 to 30. Alternatively, the UE may transmit any one of Equation 23 to 26 or any one of Equations 31 to 34. The UE may transmit any one of Equations 27 to 30 or any one of Equations 31 to 34. The UE may transmit one or more equations from among Equations 23 to 26, or may transmit one or more equations from among Equations 27 to 30. Alternatively, the UE may transmit one or more equations from among Equations 23 to 26, and at the same time may transmit one or more equations from among Equations 31 to 34. The UE may transmit one or more equations from among Equations 27 to 30, and at the same time may transmit one or more equations from among Equations 31 to 34. Although Equations 23 to 34 are used as exemplary equations for enabling the UE to report a PH to the eNode B, the UE may combine Equations 23 to 34 in various ways and then report the combined results to the eNode B.

However, since the UE can simultaneously transmit PUSCH and PUCCH at a PCC, the UE may report at least one of Equations 27 to 30 and at least one of Equations 31 to 34 to the eNode B at a PCC. In this case, information of Equations 27 to 30 used when the UE transmits a PHR to the eNode B may be defined as first-type PH information, and information of Equations 31 to 34 may be defined as second-type PH information.

In the LTE-A system, if the UE transmits a PH for each carrier or each antenna, overhead may be increased in terms of signaling. Therefore, the UE performs signaling using all combinations of a method for reducing overhead during PH transmission for each carrier and a method for reducing overhead during PH transmission for each antenna, such that signaling overhead can be greatly reduced.

In addition, the UE may report a PH for each antenna in association with a UL primary carrier (or a UL carrier linked to a DL primary carrier) or a specific carrier (i.e., a carrier implicitly or explicitly known to the UE), and may report one PH in association with other carriers.

Information regarding a method for reporting a PH for each carrier by the UE may be signaled using a UE-specific method or a carrier-specific method. Alternatively, information regarding a method for reporting a PH for each carrier by the UE may be implicitly predefined as necessary.

In addition, information regarding a method for reporting a PH for each antenna by the UE may be UE-specifically or carrier-specifically signaled. Alternatively, information regarding a method for reporting a PH for each antenna by the UE may be implicitly predefined as necessary.

A fourth case (Case 4) will hereinafter be described in detail. In accordance with Case 4, the UE may differently establish a maximum power of PUCCH and a maximum power of PUSCH under the condition that different maximum powers are established according to PUCCH and PUSCH. In this case, each maximum power may be predefined, or the eNode B may signal each maximum power as necessary. In this case, the eNode B may signal one absolute value or one offset as necessary. Alternatively, the eNode B may signal only one offset as necessary.

As described above, provided that different maximum powers are established and different $P_{MAX}$ values are assigned to PH equations of PUSCH and PUCCH as shown in the above-mentioned cases 1 to 3, the same results can be obtained.

Exemplary embodiments described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. Also, it will be obvious to those skilled in the art that claims that are not explicitly cited in the appended claims may be presented in combination as an exemplary embodiment of the present invention or included as a new claim by subsequent amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all changes which comes within the equivalent scope of the invention are included in the scope of the invention.

INDUSTRIAL APPLICABILITY

The UE apparatus for transmitting a power headroom report (PHR) supporting multiple carriers and a method for the same according to embodiments of the present invention can be applied to various mobile communication systems, for example, 3GPP LTE-A, IEEE 802 system, and the like.

The invention claimed is:

1. A method for transmitting a power headroom report (PHR) by a user equipment (UE) in a communication system supporting a plurality of carriers, the method comprising:
   transmitting, to the eNode B, a power headroom report (PHR) related to the plurality of carriers configured for the UE,
   wherein the power headroom report (PHR) comprises a first type power headroom (PH) and a second type power headroom (PH),
   wherein while the first type power headroom (PH) is calculated for a power headroom report (PHR) related to a primary carrier and a non-primary carrier, the second type power headroom (PH) is calculated for a power headroom report (PHR) related to the primary carrier other than the non-primary carrier,
   wherein the first type power headroom (PH) is calculated for a physical uplink shared channel (PUSCH) transmission,
   wherein the second type power headroom (PH) is calculated for a simultaneous transmission of a physical uplink control channel (PUCCH) and the PUSCH,
   wherein the power headroom report (PHR) further comprises information indicating at least one carrier index related to the first type power headroom (PH),
   wherein a maximum UE output power is configured per carrier, the second type power headroom (PH) is calculated based on a maximum UE output power for the primary carrier, and
   wherein the power headroom report (PHR) is transmitted as a type of MAC Control Element.

2. The method of claim 1, wherein the first type power headroom (PH) or the second type power headroom (PH) is valid for a specific subframe interval.

3. The method of claim 1, wherein the power headroom report (PHR) is transmitted if a predefined event occurs.

4. A user equipment for transmitting a power headroom report (PHR) in a communication system supporting a plurality of carriers, the user equipment comprising:
   a transmitter configured to transmit, to the eNode B, a power headroom report (PHR) related to the plurality of carriers configured for the UE,
   wherein the power headroom report (PHR) comprises a first type power headroom (PH) and a second type power headroom (PH),
   wherein while the first type power headroom (PH) is calculated for a power headroom report (PHR) related to a primary carrier and a non-primary carrier, the second type power headroom (PH) is calculated for a power headroom report (PHR) related to the primary carrier other than the non-primary carrier,
   wherein the first type power headroom (PH) is calculated for a physical uplink shared channel (PUSCH) transmission,
   wherein the second type power headroom (PH) is calculated for a simultaneous transmission of a physical uplink control channel (PUCCH) and the PUSCH,
   wherein the power headroom report (PHR) further comprises information indicating at least one carrier index related to the first type power headroom (PH), wherein a maximum UE output power is configured per carrier, the second type power headroom (PH) is calculated based on a maximum UE output power for the primary carrier, and wherein the power headroom report (PHR) is transmitted as a type of MAC Control Element.

5. The user equipment of claim 4, wherein the first type power headroom (PH) or the second type power headroom (PH) is valid for a specific subframe interval.

6. The user equipment of claim 4, wherein the power headroom report (PHR) is transmitted if a predefined event occurs.

7. A method for receiving a power headroom report (PHR) by an eNode B in a communication system supporting a plurality of carriers, the method comprising:

receiving, to the eNode B, a power headroom report (PHR) related to the plurality of carriers configured for the UE, wherein the power headroom report (PHR) comprises a first type power headroom (PH) and a second type power headroom (PH), wherein while the first type power headroom (PH) is calculated for a power headroom report (PHR) related to a primary carrier and a non-primary carrier, the second type power headroom (PH) is calculated for a power headroom report (PHR) related to the primary carrier other than the non-primary carrier, wherein the first type power headroom (PH) is calculated for a physical uplink shared channel (PUSCH) transmission, wherein the second type power headroom (PH) is calculated for a simultaneous transmission of a physical uplink control channel (PUCCH) and the PUSCH, wherein the power headroom report (PHR) further comprises information indicating at least one carrier index related to the first type power headroom (PH), wherein a maximum UE output power is configured per carrier, the second type power headroom (PH) is calculated based on a maximum UE output power for the primary carrier, and wherein the power headroom report (PHR) is transmitted as a type of MAC Control Element.

8. The method of claim 7, wherein the first power headroom (PH) or the second power headroom (PH) is valid for a specific subframe interval.

9. The method of claim 7, wherein the power headroom report (PHR) is transmitted if a predefined event occurs.

10. An eNode B for receiving a power headroom report (PHR) in a communication system supporting a plurality of carriers, the eNode B comprising:

a receiver configured to receive, to the eNode B, a power headroom report (PHR) related to the plurality of carriers configured for the UE, wherein the power headroom report (PHR) comprises a first type power headroom (PH) and a second type power headroom (PH), wherein while the first type power headroom (PH) is calculated for a power headroom report (PHR) related to a primary carrier and a non-primary carrier, the second type power headroom (PH) is calculated for a power headroom report (PHR) related to the primary carrier other than the non-primary carrier, wherein the first type power headroom (PH) is calculated for a physical uplink shared channel (PUSCH) transmission, wherein the second type power headroom (PH) is calculated for a simultaneous transmission of a physical uplink control channel (PUCCH) and the PUSCH, wherein the power headroom report (PHR) further comprises information indicating at least one carrier index related to the first type power headroom (PH), wherein a maximum UE output power is configured per carrier, the second type power headroom (PH) is calculated based on a maximum UE output power for the primary carrier, and wherein the power headroom report (PHR) is transmitted as a type of MAC Control Element.

11. The eNode B of claim 10, wherein the first power headroom (PH) or the second power headroom (PH) is valid for a specific subframe interval.

12. The eNode B of claim 10, wherein the power headroom report (PHR) is transmitted if a predefined event occurs.

* * * * *